US010207579B2

(12) United States Patent
Ryu et al.

(10) Patent No.: US 10,207,579 B2
(45) Date of Patent: Feb. 19, 2019

(54) FUEL-MIXING PREVENTION FILLER NECK DEVICE

(71) Applicants: Hyundai Motor Company, Seoul (KR); Kia Motors Corporation, Seoul (KR); SAMBO MOTORS, Daegu (KR)

(72) Inventors: Bu Yeol Ryu, Gyeonggi-do (KR); Ju Tae Song, Gyeonggi-do (KR); Cheol Hun Cho, Gyeonggi-do (KR); Jeong Seok Lee, Seoul (KR); Gun Woo Kim, Daegu (KR); Young Jae Do, Daegu (KR)

(73) Assignees: Hyundai Motor Company, Seoul (KR); Kia Motors Corporation, Seoul (KR); SAMBO MOTORS CO., LTD., Daegu (KR)

( * ) Notice: Subject to any disclaimer, the term of this patent is extended or adjusted under 35 U.S.C. 154(b) by 184 days.

(21) Appl. No.: 15/297,343

(22) Filed: Oct. 19, 2016

(65) Prior Publication Data

US 2017/0291487 A1    Oct. 12, 2017

(30) Foreign Application Priority Data

Apr. 8, 2016    (KR) .................. 10-2016-0043544

(51) Int. Cl.
*B60K 15/04*    (2006.01)
*B60K 15/03*    (2006.01)

(52) U.S. Cl.
CPC .......... *B60K 15/04* (2013.01); *B60K 15/0406* (2013.01); *B60K 2015/03309* (2013.01);
(Continued)

(58) Field of Classification Search
CPC ................ B60K 15/04; B60K 15/0406; B60K 2015/03309; B60K 2015/03453;
(Continued)

(56) References Cited

U.S. PATENT DOCUMENTS

2012/0279612 A1* 11/2012 Washio .................. B60K 15/04
                                                              141/350
2014/0352846 A1* 12/2014 Ryu ....................... B60K 15/04
                                                              141/350
(Continued)

FOREIGN PATENT DOCUMENTS

JP    2006-103679 A    4/2006
KR    10-0462670 B1    12/2004
(Continued)

*Primary Examiner* — Andrew Perreault
(74) *Attorney, Agent, or Firm* — Mintz Levin Cohn Ferris Glovsky and Popeo, P.C.; Peter F. Corless (57) ABSTRACT

A fuel-mixing prevention filler neck device is provided. The fuel-mixing prevention filler neck device includes a fuel dispensing gun insertion unit that receives a fuel dispensing thereinto and a coupling unit that provides fluid communication with a bottom of the fuel dispensing gun insertion unit. The coupling unit is disposed on an exterior circumferential surface thereof with coupling protrusions for fastening with a plurality of slots formed in a filler pipe. Further, a first side of a lower portion of the coupling unit is open to form a coupling region. A misfueling prevention unit slidably moves to the coupling region to be coupled to the coupling unit. Additionally, the misfueling prevention unit is closed when a gasoline fuel dispensing gun is inserted and being opened when a diesel fuel dispensing gun is inserted.

7 Claims, 6 Drawing Sheets

(52) U.S. Cl.
CPC .............. *B60K 2015/03453* (2013.01); *B60K 2015/0438* (2013.01); *B60K 2015/0461* (2013.01); *B60K 2015/0483* (2013.01)

(58) Field of Classification Search
CPC .... B60K 2015/0438; B60K 2015/0461; B60K 2015/0483
USPC ....................................................... 220/86.2
See application file for complete search history.

(56) References Cited

U.S. PATENT DOCUMENTS

| | | | |
|---|---|---|---|
| 2015/0069058 A1* | 3/2015 | Ryu ....................... | B60K 15/04 220/86.2 |
| 2015/0102031 A1* | 4/2015 | Yoshida ................. | B60K 15/04 220/86.2 |
| 2015/0158380 A1* | 6/2015 | Kim ................... | B60K 15/0406 220/86.2 |
| 2015/0298542 A1* | 10/2015 | Kim ....................... | B60K 15/04 220/86.2 |
| 2016/0318389 A1* | 11/2016 | Sperando ............... | B60K 15/04 |

FOREIGN PATENT DOCUMENTS

| | | |
|---|---|---|
| KR | 2009-0034449 A | 4/2009 |
| KR | 10-2012-0001669 A | 1/2012 |
| KR | 10-1417637 B1 | 7/2014 |
| KR | 10-1481343 B1 | 1/2015 |
| KR | 10-1491287 B1 | 2/2015 |
| KR | 10-1510051 B1 | 4/2015 |

\* cited by examiner

FUEL-MIXING PREVENTION FILLER NECK DEVICE

CROSS-REFERENCE TO RELATED APPLICATION

This application claims under 35 U.S.C. § 119(a) the benefit of priority to Korean Patent Application No. 10-2016-0043544 filed on Apr. 8, 2016, the entire contents of which are incorporated herein by reference.

BACKGROUND (a) Technical Field

The present disclosure relates to a fuel-mixing prevention filler neck device and more particularly, to a fuel-mixing prevention filler neck device that provides a structure to apply a misfueling prevention device to a filler pipe.

(b) Background Art

Generally, a vehicle includes a fuel tank in which fuel required for the combustion of an engine is stored and a fuel filler neck to supply fuel at the end of a fuel line coupled to the fuel tank. Fuel dispensing guns used to inject fuel into the fuel filler neck, have variable diameters for gasoline or diesel fuel and also have different refueling rates.

Diesel fuel dispensing guns for injecting diesel fuel typically have a greater diameter than the diameter of gasoline fuel dispensing guns for injecting gasoline fuel. Consequently, the fuel filler necks for diesel vehicles have a greater diameter than a diameter of fuel filler necks for gasoline vehicles. For example, the diameters of diesel fuel dispensing guns are approximately 25-31 mm and the diameters of gasoline fuel dispensing guns are approximately 19-21 mm. Further, the diameters of fuel filler necks for gasoline vehicles are approximately 22 mm and the diameters of fuel filler necks for diesel vehicles are approximately 26-32 mm.

Accordingly, although gasoline vehicles do not have a misfueling problem due to diesel fuel dispensing guns cannot be inserted into the gasoline vehicles. However, diesel vehicles are frequently supplied with wrong fuel due to gasoline fuel dispensing guns as well as diesel fuel dispensing guns are capable of be inserted into the diesel vehicles. Such misfueling may cause deterioration in the output of the engine and damage to the engine, may cause major accidents when the engine stops during driving and may result in damage to devices of a fuel system including an injection pump.

SUMMARY

The present invention provides a fuel-mixing prevention filler neck device with a structure that may include an adaptor having coupling protrusions mounted in a misfueling prevention system. The coupling protrusions may be provided to enable an existing misfueling prevention, in which a flapper is selectively opened when a fuel gun for a diesel vehicle is inserted to be more easily installed in a filler pipe.

In one aspect, the present invention provides a fuel-mixing prevention filler neck device that may include a fuel dispensing gun insertion unit configured to insert a fuel dispensing gun thereinto and a coupling unit in fluid communication with a bottom of the fuel dispensing gun insertion unit. The coupling unit may be disposed on an exterior circumferential surface thereof with coupling protrusions to be fastened with a plurality of slots formed in a filler pipe. For example, a first side of a lower portion of the coupling unit may be open to form a coupling region and a misfueling prevention unit may be configured to slidably adjust the coupling region to be coupled to the coupling unit. The misfueling prevention unit may be disposed in a closed position when a gasoline fuel dispensing gun is inserted and may remain in an opened position when a diesel fuel dispensing gun is inserted.

In an exemplary embodiment, the misfueling prevention unit may include a housing configured to receive the fuel dispensing gun, having passed through the coupling unit. The sliding protrusions mounted in a lower portion of the housing may be configured to be slidable in a lateral direction. The sliding protrusions may be adjacent to one another and laterally spaced apart from each other. A spring may horizontally couple and elastically support the sliding protrusions. A stopper may have an engaging groove formed in one of the sliding protrusions among the sliding protrusions. A flapper hinge may be coupled to a remaining sliding protrusion among the sliding protrusions, the flapper may be separated from the engaging groove to open an opening formed in a lower end of the housing when a distance between the sliding protrusions adjacent to each other increases when the diesel fuel dispensing gun is inserted.

In another exemplary embodiment, the misfueling prevention unit may further include an air discharge aperture formed in one side of an inlet of the housing and configured to discharge air within the housing during fueling. The coupling unit may include an upper main body formed as a cylinder to be inserted into the filler pipe. The upper main body may include the coupling protrusions and a single anti-rotation protrusion on an exterior circumferential surface of the upper main body. A lower main body may include one open side to form the coupling region. An interior side surface of the lower main body may include a multiply-stepped support surface to correspond to a shape of an upper portion of the misfueling prevention unit inserted into the coupling region.

In yet another exemplary embodiment, the misfueling prevention unit may include a guide member configured to adjust the sliding movement of the misfueling prevention unit into the coupling region. The guide member may be inserted into a plurality of guide grooves formed in a lower surface of the lower main body in a direction of a sliding movement. The coupling unit may include an O-ring member disposed at a boundary between the upper main body and the lower main body to provide airtightness of the coupling unit (e.g., an airtight seal).

In a still further exemplary embodiment, the filler pipe may include the slots configured to receive insertion of the coupling protrusions. A coupling groove may be configured to receive the anti-rotation protrusion. The slots and the coupling groove may be spaced apart from one another by a predetermined distance along an exterior circumferential surface of an upper end of the filler pipe. In addition, the fuel dispensing gun insertion unit may be configured to insertion of a fuel cap into and may include screw-threads configured to rotationally fasten the fuel cap on an interior circumferential surface of the fuel dispensing gun insertion unit.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter, the exemplary embodiment of the present invention will be described in detail with reference to the accompanying drawings to allow those skilled in the art to easily practice the present invention. Advantages and features of the present invention and methods for achieving the same will be clearly understood with reference to the following detailed description of embodiments in conjunction with the accompanying drawings. However, the present invention is not limited to the exemplary embodiments disclosed herein, but may be implemented in various different forms. The exemplary embodiments are merely given to make the disclosure of the present invention complete and to completely instruct the scope of the invention to those skilled in the art, and the present invention should be defined by the scope of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
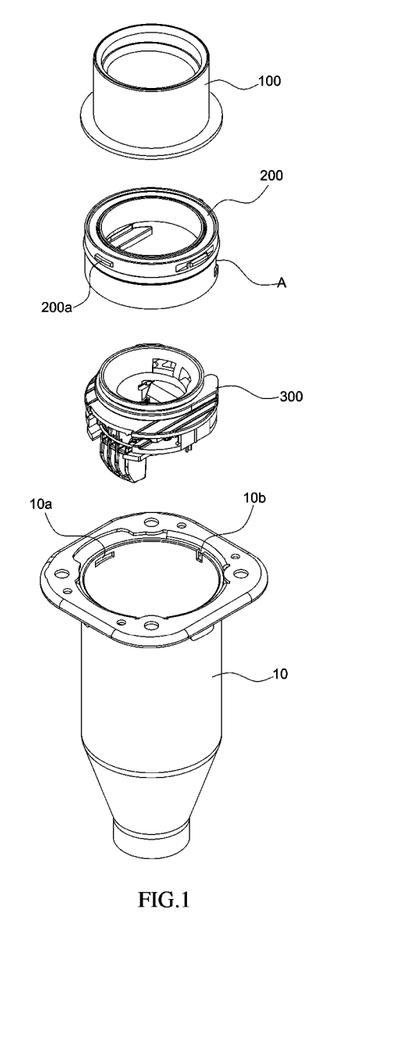
FIG. 1 is an exemplary exploded perspective view schematically illustrating a fuel-mixing prevention filler neck device in accordance with an exemplary embodiment of the present invention.
Figure 2:
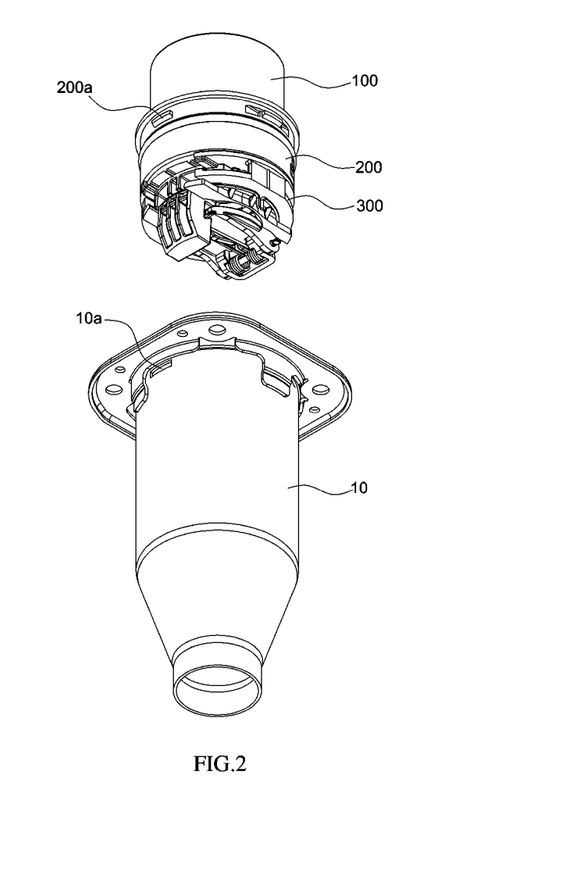
FIG. 2 is a view illustrating the assembled state of the fuel-mixing prevention filler neck device in accordance with the exemplary embodiment of the present invention.

FIG. 1 is an exemplary exploded perspective view schematically illustrating a fuel-mixing prevention filler neck device in accordance with an exemplary embodiment of the present invention. FIG. 2 is an exemplary view illustrating the assembled state of the fuel-mixing prevention filler neck device in accordance with the exemplary embodiment of the present invention. As illustrated in FIGS. 1 and 2, the fuel-mixing prevention filler neck device may include a fuel dispensing gun insertion unit 100, a coupling unit 200 and a misfueling prevention unit 300.

The fuel dispensing gun insertion unit 100 may be configured to receive a fuel dispensing gun therein. Additionally, a fuel cap may be inserted into the fuel dispensing gun insertion unit 100 upon completion of the fueling. For example, the fuel dispensing gun insertion unit 100 may include screw-threads on the interior circumferential surface of the fuel dispensing gun insertion unit 100 to selectively couple the fuel cap (e.g., via rotation of the fuel cap).

The coupling unit 200 may have a tubular shape or the like and may be in fluid communication with the bottom of the fuel dispensing gun insertion unit 100. The coupling unit 200 may include coupling protrusions 200a on the exterior circumferential surface of the coupling unit 200. In particular, the coupling protrusions 200a may be fitted into a plurality of slots 10a formed in a filler pipe 10 to fix the position of the coupling unit 200. One side of the lower portion of the coupling unit 200 may be open in a shape that corresponds to a predetermined shape of the upper portion of the misfueling prevention unit 300 to form a coupling region A. The misfueling prevention unit 300 may be configured to be slidably inserted into the coupling region A.

In other words, the misfueling prevention unit 300 may be inserted into the coupling region A to be integrally coupled to the coupling unit 200. The misfueling prevention unit 300 may remain closed upon insertion of a gasoline fuel dispensing gun and may be disposed in an opened position upon insertion of a diesel fuel dispensing gun 2. The misfueling prevention unit 300 described above may not need to add a process of fixing the position of the misfueling prevention unit 300 since the misfueling prevention unit 300 may be easily fixedly within the interior of the filler pipe 10 by fixing the coupling unit 200 via the fastening of the slots 10a and the coupling protrusions 200a.

Figure 3:
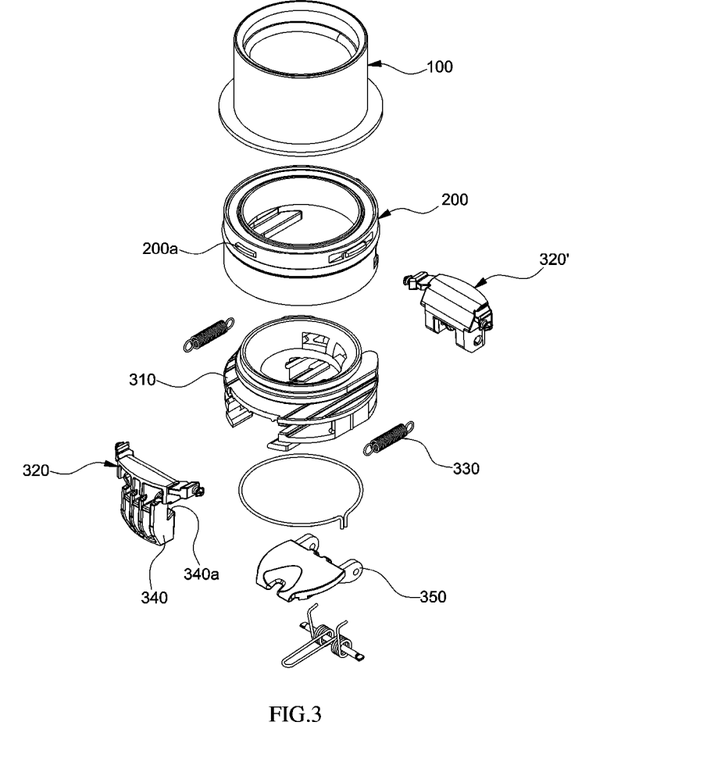
FIG. 3 is an exemplary exploded perspective view illustrating the configuration of a misfueling prevention unit included in the fuel-mixing prevention filler neck device in accordance with the exemplary embodiment of the present invention.
Figure 4:
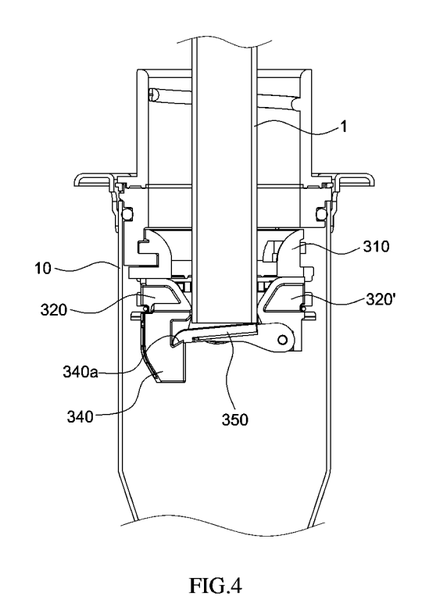
FIG. 4 is an exemplary view illustrating the operating state of the misfueling prevention unit when a gasoline fuel dispensing gun is inserted into the fuel-mixing prevention filler neck device in accordance with the exemplary embodiment of the present invention.
Figure 5:
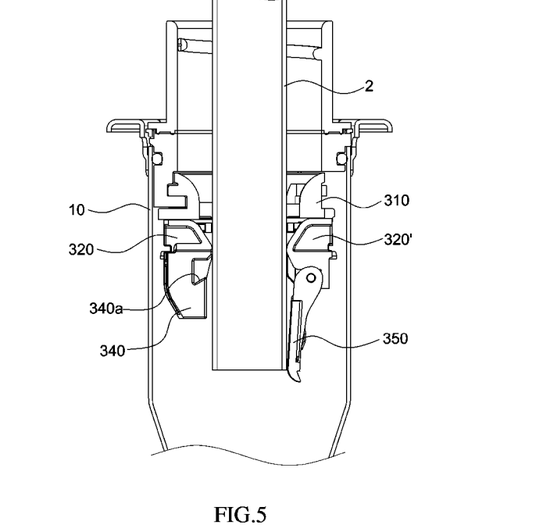
FIG. 5 is an exemplary view illustrating the operating state of the misfueling prevention unit when a diesel fuel dispensing gun is inserted into the fuel-mixing prevention filler neck device in accordance with the exemplary embodiment of the present invention.

FIG. 3 is an exemplary detailed perspective view illustrating the configuration of a misfueling prevention unit included in the fuel-mixing prevention filler neck device in accordance with the exemplary embodiment of the present invention. FIG. 4 is an exemplary view illustrating the operating state of the misfueling prevention unit when a gasoline fuel dispensing gun is inserted into the fuel-mixing prevention filler neck device in accordance with the exemplary embodiment of the present invention. FIG. 5 is an exemplary view illustrating the operating state of the misfueling prevention unit when a diesel fuel dispensing gun is inserted into the fuel-mixing prevention filler neck device in accordance with the exemplary embodiment of the present invention.

As illustrated in FIG. 3, the fuel-mixing prevention filler neck device may include the misfueling prevention unit 300. In particular, the misfueling prevention unit 300 may include a housing 310, sliding protrusions 320 and 320', springs 330, a stopper 340, and a flapper 350. The housing 310 may be configured to receive the fuel dispensing gun that has passed through the coupling unit 200. The sliding protrusions 320 and 320' may be mounted in the lower portion of the housing 310 to be slidable in the lateral direction. The sliding protrusions 320 and 320' may be laterally spaced apart from and positioned adjacent to each other (e.g., to face each other). The springs 330 may horizontally connect and elastically support the facing sliding protrusions 320 and 320'.

The stopper 340 may be formed on a first sliding protrusion 320 among the facing sliding protrusions 320 and 320' and may have an engaging groove 340a. The flapper 350 may be pivotally hinge-coupled to the second sliding protrusion 320'of the adjacent sliders 320 and 320.' When the diesel fuel dispensing gun is inserted, the flapper 350 may be released from the engaging groove 340a as the facing sliding protrusions 320 and 320' are adjusted away from each other. Accordingly, a bottom opening in the housing 310 may be opened by the force of pressure applied by the fuel dispensing gun.

As illustrated in FIG. 4, an operation when the gasoline fuel dispensing gun 1 is inserted into a diesel vehicle will be described below with reference to the configuration of the misfueling prevention unit 300. When the gasoline fuel dispensing gun 1, having a diameter of approximately 21 mm, is inserted into a fuel filler neck of the diesel vehicle, having a diameter of approximately 25 mm, the inserted gasoline fuel dispensing gun 1 fixes the sliding protrusions 320 and 320' away from each other due to the diameter of the gasoline fuel dispensing gun 1 may be less than the distance between the adjacent sliding protrusions 320 and 320'. Thus, the flapper 350 is coupled to the engaging groove 340a of the stopper 340. Consequently, when the gasoline fuel dispensing gun 1 is inserted, rotation of the flapper 350 may be restricted and the bottom opening in the housing 310 may be prevented from being opened.

Conversely, as illustrated in FIG. 5, an operation when the diesel fuel dispensing gun 2 is inserted into the diesel vehicle will be described below with reference to the configuration of the misfueling prevention unit 300. When the diesel fuel dispensing gun 2, having a diameter of approximately 24 mm, is inserted into the fuel filler neck of the diesel vehicle, having a diameter of approximately 25 mm, the inserted diesel fuel dispensing gun 2 may be configured to adjust (e.g., move) the sliding protrusions 320 and 320' away from each other since the diameter of the diesel fuel dispensing gun 2 is greater than the distance between the facing sliding protrusions 320 and 320'.

The distance between the sliding protrusions 320 and 320' may be increased and the flapper 350 may be configured to be released from the engaging groove 340a of the stopper 340. Consequently, the flapper 350 may be configured to rotate by the force of the pressure applied via the insertion of the diesel fuel dispensing gun 2. Thus, the diesel fuel dispensing gun 2 may be configured to rotate the flapper 350 to open the bottom opening in the housing 310. Accordingly, fueling for the diesel vehicle may be accomplished when the diesel fuel dispensing gun 2, not the gasoline fuel dispensing gun 1, is inserted. In particular, through the configuration and operation described above, the misfueling prevention unit 300 in accordance with the present exemplary embodiment maintains a closure of the bottom opening in the housing 310 even when the gasoline fuel dispensing gun 1 is inserted into the diesel vehicle, thereby preventing the diesel vehicle from being fueled with gasoline.

Figure 6:
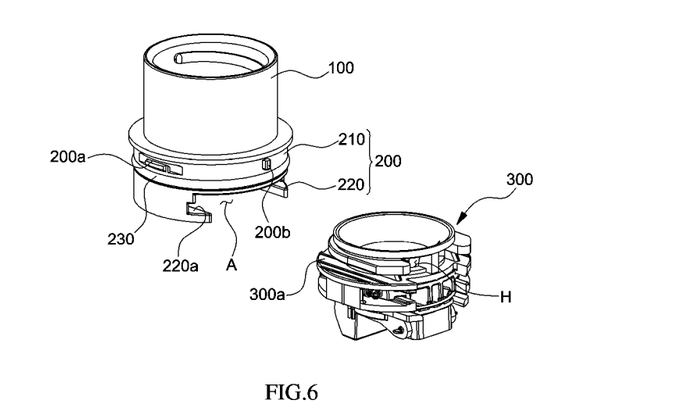
FIG. 6 is an exemplary view illustrating the coupling relationship between the misfueling prevention unit and a coupling unit in the fuel-mixing prevention filler neck device in accordance with the exemplary embodiment of the present invention.
Figure 7:
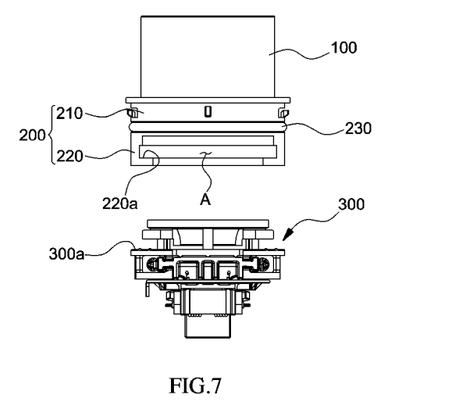
FIG. 7 is an exemplary view illustrating a stepped support surface within the interior of a coupling region included in the fuel-mixing prevention filler neck device in accordance with the exemplary embodiment of the present invention.
Figure 8:
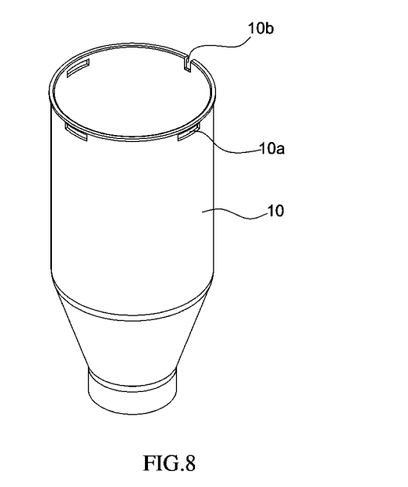
FIG. 8 is an exemplary view illustrating a filler pipe of the fuel-mixing prevention filler neck device in accordance with the exemplary embodiment of the present invention.

FIG. 6 is an exemplary view illustrating the coupling relationship between the misfueling prevention unit and the coupling unit in the fuel-mixing prevention filler neck device in accordance with the exemplary embodiment of the present invention. FIG. 7 is an exemplary view illustrating a stepped support surface within the interior of the coupling region included in the fuel-mixing prevention filler neck device in accordance with the exemplary embodiment of the present invention. FIG. 8 is an exemplary view illustrating the filler pipe of the fuel-mixing prevention filler neck device in accordance with the exemplary embodiment of the present invention.

As illustrated in FIG. 6, the fuel-mixing prevention filler neck device may include the coupling unit 200. The coupling unit 200 may include an upper main body 210 and a lower main body 220. The upper main body 210 may be formed as a cylinder to be inserted into the filler pipe 10. Additionally, the upper main body 210 may include the coupling protrusions 200a and a single anti-rotation protrusion 200b on the exterior circumferential surface of the upper main body 210. A first side of the lower main body 220 may be open to form the coupling region A. In other words, to install the misfueling prevention unit 300, may be prepared as a prefabricated unit. For example, within the filler pipe 10, a separate fastening structure may be disposed on the exterior circumferential surface of the misfueling prevention unit 300.

However, the misfueling prevention unit 300 may cause difficulty to add the separate fastening structure. Accordingly, this may increase the cost of manufacture of the misfueling prevention unit 300 may increase and the number of fabrication processes may increase. Therefore, the lower main body 220 in accordance with the exemplary embodiment may allow the upper portion of the prefabricated misfueling prevention unit 300 to be inserted into the coupling region A to couple the coupling unit 200 and the misfueling prevention unit 300. Thus, the upper main body 210 may be fastened to the separate fastening structure and the filler pipe 10 and the misfueling prevention unit 300 may be fixedly disposed within the filler pipe 10.

as Accordingly, as illustrated in FIG. 7, the interior side surface of the lower main body 220 may be a multiple stepped support surface 220a to correspond to the shape of the upper portion of the misfueling prevention unit 300 inserted into the coupling region A. The multiply-stepped support surface 220a may support the upper portion of the misfueling prevention unit 300 inserted into the coupling region A in the coupling direction. Through the multiple stepped shape thereof described above, the multiply-stepped support surface 220a may support the exterior circumferential surface of the upper portion of the misfueling prevention unit 300 and thus the coupling unit 200 and the misfueling prevention unit 300 may be integrally coupled to each other.

In particular, the misfueling prevention unit 300 may include an air discharge aperture H formed in one side of an inlet of the housing 310 that discharges air within the interior of the housing 310. The misfueling prevention unit 300 may be inserted into the coupling region A in the coupling direction when the air discharge aperture H is disposed adjacent to the inlet of the coupling region A. The air discharge path of the air discharge aperture H may be secured even when the misfueling prevention unit 300 is inserted into the coupling region A. Accordingly, the air within the interior of the housing 310 may be discharged to the exterior during fueling.

Additionally, the misfueling prevention unit 300 may further include a guide member 300a. The guide member 300a may be configured to be inserted into a plurality of guide grooves (not illustrated) formed in the lower surface of the lower main body 220 in the sliding movement direction. The guide member 300a may be rail-coupled to the guide grooves (not illustrated) in the lower surface of the lower main body 220 when the misfueling prevention unit 300 is inserted into the coupling region A. To facilitate the sliding movement of the misfueling prevention unit 300. Additionally, the coupling unit 200 may include an O-ring member 230 installed at the boundary between the upper main body 210 and the lower main body 220 to provide airtightness of the coupling unit 200. Although the present exemplary embodiment illustrates the installation of a single O-ring member 230 multiple O-ring members 230 may be installed to provide airtightness of the coupling unit 200.

Further, as illustrated in FIG. 8, the filler pipe 10, may be configured to receive the coupling unit 200 and may be coupled thereto. The filler pipe 10 may include the slots 10a for the insertion of the coupling protrusions 200a and a coupling groove 10b for the insertion of the single anti-rotation protrusion 200b, that may be spaced apart from one another by a predetermined distance on the exterior circumferential surface of the upper end of the filler pipe 10. In other words, the slots 10a may be formed in the filler pipe 10 with a predetermined width. To allow the coupling protrusions 200a to be more easily inserted into and coupled to the slots 10a, the coupling protrusions 200a may a width less than the width of the slots 10a.

The coupling protrusions 200a may prevent the rotation of the coupling unit 200 caused by the width difference described above when, for example vibrations occur in the vehicle. Accordingly, the filler pipe 10 may include the coupling groove 10b to enable the anti-rotation protrusion 200b to be inserted into the coupling groove 10b. Namely, the coupling unit 200 fastened within the interior of the filler pipe 10 may be prevented from being rotated. The width of the coupling groove 10b may be the about the same as the width of the anti-rotation protrusion 200b.

According to the present invention, the fuel-mixing prevention filler neck device, which has a structure in which an adaptor having coupling protrusions may be mounted in a misfueling prevention. The coupling protrusions may be provided to enable an existing misfueling prevention, in which a flapper is selectively opened when a fuel gun for a diesel vehicle is inserted, to be more easily installed in a filler pipe. Accordingly, a separate process for installing the misfueling prevention unit may be prevented. Additionally, the fuel-mixing prevention filler neck device of the present invention may allow the existing misfueling prevention unit to be installed to the filler pipe by coupling the coupling protrusions to the filler pipe, thereby facilitating the application of a structure to prevent a diesel vehicle from being fueled with gasoline.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel-mixing prevention filler neck device, comprising:
   a fuel dispensing gun insertion unit into which a fuel dispensing gun is received;
   a coupling unit communicating with a bottom of the fuel dispensing gun insertion unit, the coupling unit disposed on an exterior circumferential surface thereof with coupling protrusions to couple the slots in a filler pipe, having a coupling region which is opened one side of a lower portion of the coupling unit; and
   a misfueling prevention unit slidably moved toward the coupling region and coupled to the coupling unit,
   wherein the misfueling prevention unit is closed when a gasoline fuel dispensing gun is inserted and is opened when a diesel fuel dispensing gun is inserted,
   wherein the misfueling prevention unit includes:
      a housing introducing the fuel dispensing gun that passes through the coupling unit thereinto;
      sliding protrusions mounted in a lower portion of the housing to be slidable adjusted in a lateral direction, the sliding protrusions being laterally spaced apart and adjacent to each other;
      a spring horizontally coupling and elastically supporting the sliding protrusions;
      a stopper having an engaging groove in any one of the sliding protrusions; and
      a flapper hinge-coupled to a remaining sliding protrusions of the sliding protrusions, the flapper released from the engaging groove to open an opening in a lower end of the housing as a distance between the adjacent sliding protrusions increases when the diesel fuel dispensing gun is inserted.

2. The device of claim 1, wherein the misfueling prevention unit further includes an air discharge aperture in a first side of an inlet of the housing to allow air within the interior of the housing to be discharged during fueling.

3. The device of claim 1, wherein the coupling unit includes:
   an upper main body having a cylinder shape to be inserted into the filler pipe, wherein the upper main body has the coupling protrusions and an anti-rotation protrusion which are disposed on an exterior circumferential surface of the upper main body; and a lower main body having a first open side to form the coupling region, and an interior side surface of the lower main body having a multiply-stepped support surface to correspond to a shape of an upper portion of the misfueling prevention unit inserted into the coupling region.

4. The device of claim 3, wherein the misfueling prevention unit further includes a guide member guiding the sliding movement of the misfueling prevention unit into the coupling region, wherein the guide member is inserted into a plurality of guide grooves in a lower surface of the lower main body in a sliding movement direction.

5. The device of claim 3, wherein the coupling unit further includes an O-ring member disposed at a boundary between the upper main body and the lower main body to provide airtightness of the coupling unit.

6. The device of claim 3, wherein the filler pipe includes:
the slots receiving the coupling protrusions, and a coupling groove configured to receive the anti-rotation protrusion,
wherein the slots and the coupling groove are spaced apart from one another by a predetermined distance along an exterior circumferential surface of an upper end of the filler pipe.

7. The device of claim 1, wherein a fuel cap is inserted into the fuel dispensing gun insertion unit and the fuel dispensing gun insertion unit has screw-threads thread for fastening the fuel cap through rotation of the fuel cap.

* * * * *